Figure 1:
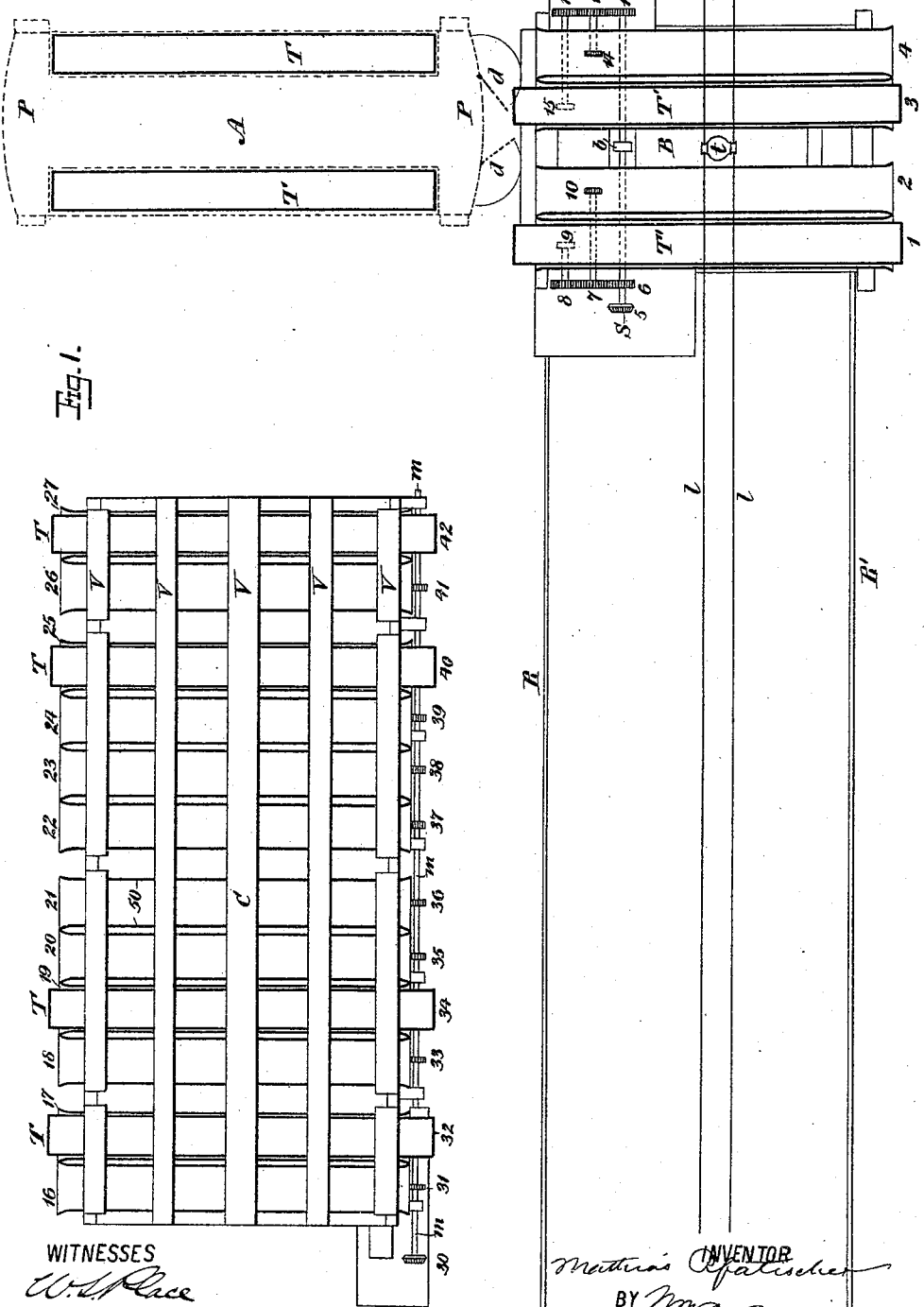

(No Model.) 5 Sheets—Sheet 1.

M. PFATISCHER.
APPARATUS FOR TRANSFERRING SECONDARY BATTERIES.

No. 493,221. Patented Mar. 7, 1893.

(No Model.) 5 Sheets—Sheet 2.

M. PFATISCHER.
APPARATUS FOR TRANSFERRING SECONDARY BATTERIES.

No. 493,221. Patented Mar. 7, 1893.

WITNESSES:

INVENTOR
Mathias Pfatischer
BY
his ATTORNEY.

THE NORRIS PETERS CO., PHOTO-LITHO., WASHINGTON, D. C.

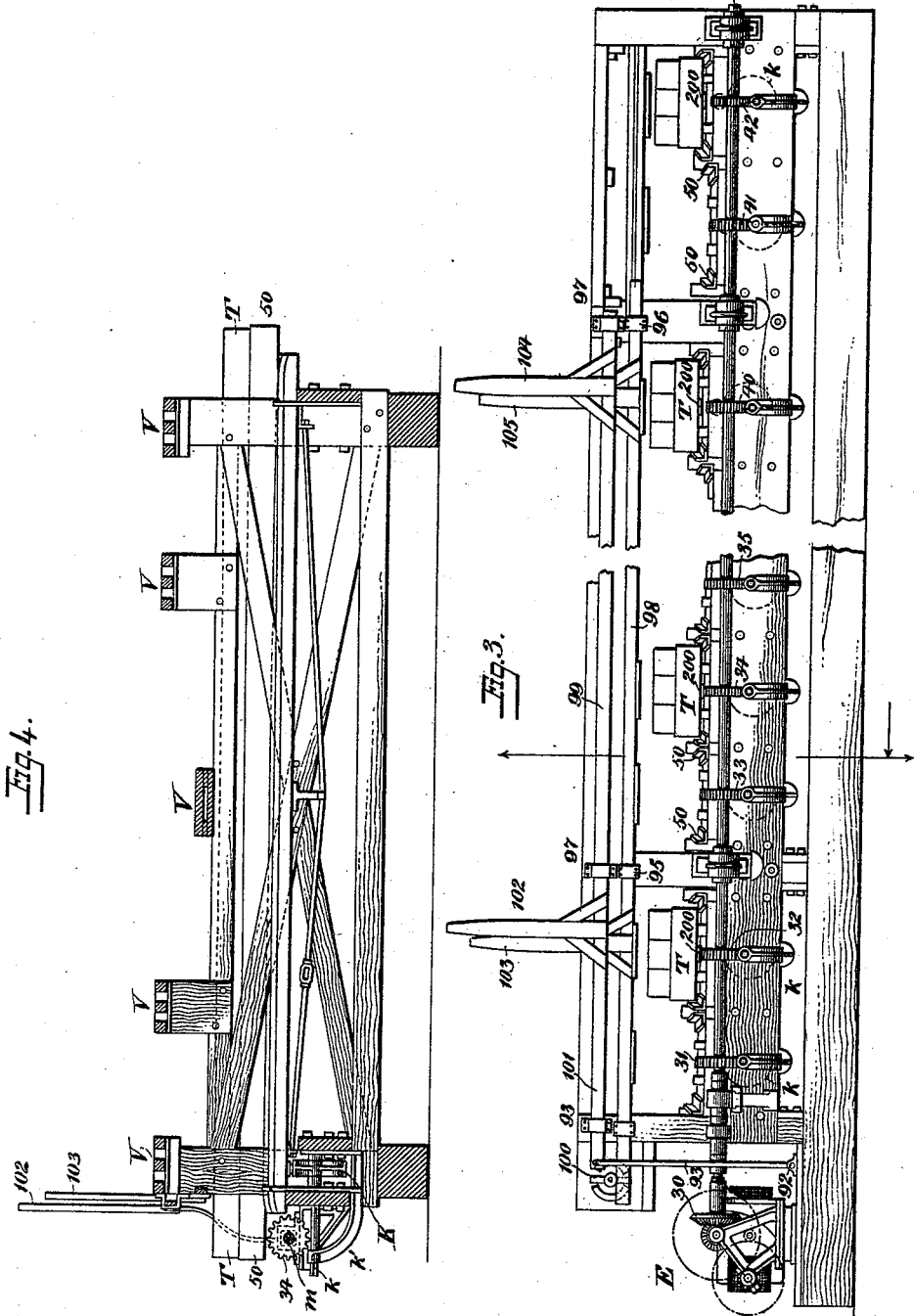

(No Model.) 5 Sheets—Sheet 4.
M. PFATISCHER.
APPARATUS FOR TRANSFERRING SECONDARY BATTERIES.
No. 493,221. Patented Mar. 7, 1893.
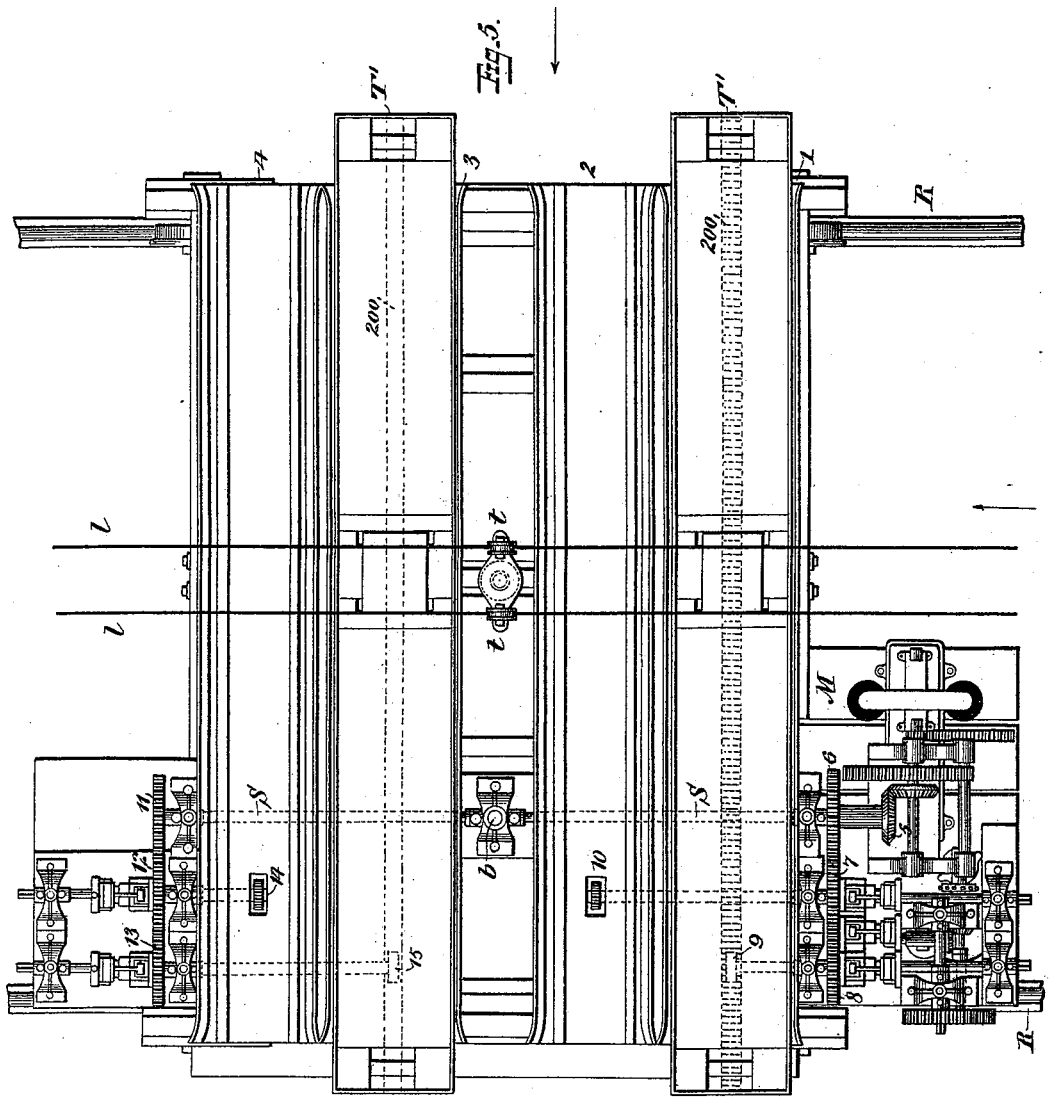

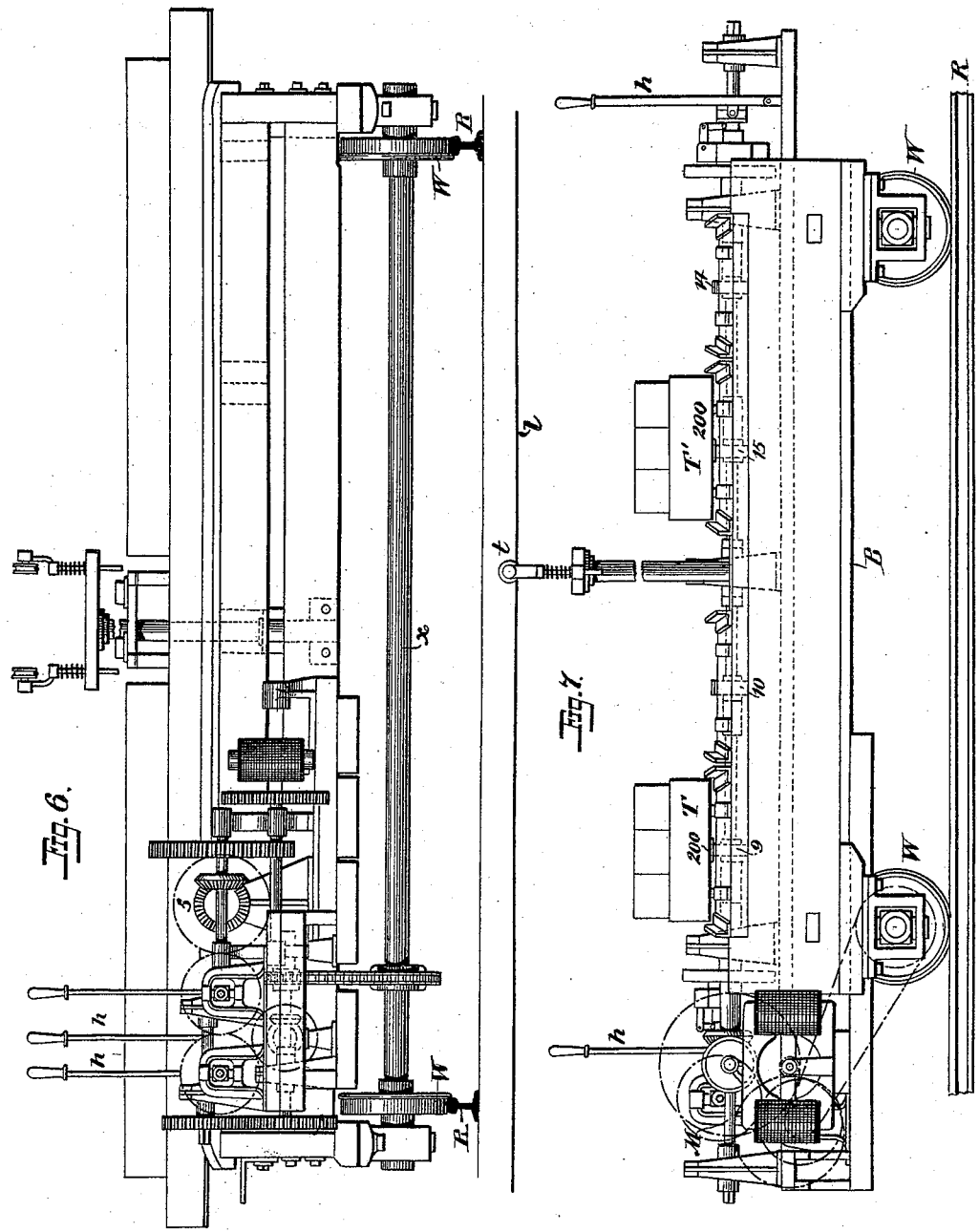

UNITED STATES PATENT OFFICE.

MATHIAS PFATISCHER, OF PHILADELPHIA, PENNSYLVANIA, ASSIGNOR TO THE ACCUMULATOR COMPANY, OF SAME PLACE.

APPARATUS FOR TRANSFERRING SECONDARY BATTERIES.

SPECIFICATION forming part of Letters Patent No. 493,221, dated March 7, 1893.

Application filed July 22, 1892. Serial No. 440,918. (No model.)

*To all whom it may concern:*

Be it known that I, MATHIAS PFATISCHER, a citizen of the United States, residing at Philadelphia, in the county of Philadelphia and State of Pennsylvania, have made certain new and useful improvements in apparatus and machinery for propelling street-cars by self-contained electric energy, such as batteries or chemical generators of electricity; and the invention particularly relates to the use of secondary batteries or batteries which have no initial power of yielding an electric current and become active only when subjected to the action of an electric current or when they are properly charged.

The object of my invention is to provide an efficient and expeditious apparatus for transferring secondary batteries from a stationary point or charging table to the car to be propelled, and for simultaneously removing the discharged or exhausted batteries from the car and depositing them at the point where they are to be charged, or on the charging table as it is called.

In my arrangement of apparatus a series of cells of secondary battery is compactly arranged in a trough or tray; there are preferably two or more parallel rows in each trough or tray; these troughs or trays containing a charged battery are placed in position on the car to be propelled, and are preferably arranged under the longitudinal seats, and are introduced by sliding them into position through a door or opening provided in the end of the car and through a similar and corresponding door in the dash board. At the charging house or power station there is arranged a table upon which there is a series of parallel tracks or ways, each track or way having substantially the same dimensions as the bottom of the trough or tray described as used to carry the secondary batteries. A dynamo electric machine driven by a steam engine or other suitable prime motor is suitably connected with this charging table, and the arrangements are such that when a trough or tray containing discharged batteries is slid into position on the charging table electrical connections are automatically made with this source of electrical energy and the operation of charge immediately begun. Each track on the charging table is provided with angular guides with which the lower or bottom edges of the rectangular trough or tray come in contact, and centrally between these guides or rails there is arranged a cogged wheel driven by an electric motor. On the bottom of the trough or tray carrying the secondary batteries there is a rack extending the entire length of the trough and meshing with the cogged wheel or pinion first referred to; each of the tracks or ways are similarly equipped, and each trough or tray has the toothed strip centrally fixed on the bottom thereof. The size and dimensions of the charging table must be sufficiently extensive to charge any number of batteries that may be in use. I prefer to locate this charging table in what is usually called the car house, and when a car containing discharged batteries comes into the house for the purpose of having its batteries replaced, the car is run in on a track until its end is in close proximity to another track preferably arranged at right angles thereto and upon which there travels a special transfer truck, this transfer truck is a wheeled vehicle having a breadth about equal to the length of the trough or tray containing the secondary batteries as they are placed in the car. On this truck I place four or more tracks or ways substantially similar in every respect to those which I have described as being employed on the charging table. There is an electric motor upon the truck by which it is propelled, and there are means provided by which the motor can be thrown out of gear with the propelling mechanism of the truck and thrown into gear with the rack upon the bottom of the trough or tray carrying the cells of battery, it therefore results that one man acting alone and unaided can perform the operation of moving these cells of battery grouped together in suitable numbers and weighing hundreds of pounds and can perform the operation of removing the discharged cells from the car and substituting charged cells therefor in less than one minute's time, as has been practically demonstrated. If, however it is deemed more expedient or economical for any reason to operate the apparatus by hand the motors or any of them may be dispensed with and the power may be manually applied by the use of a crank or equivalent device in a well known manner.

Figure 2:
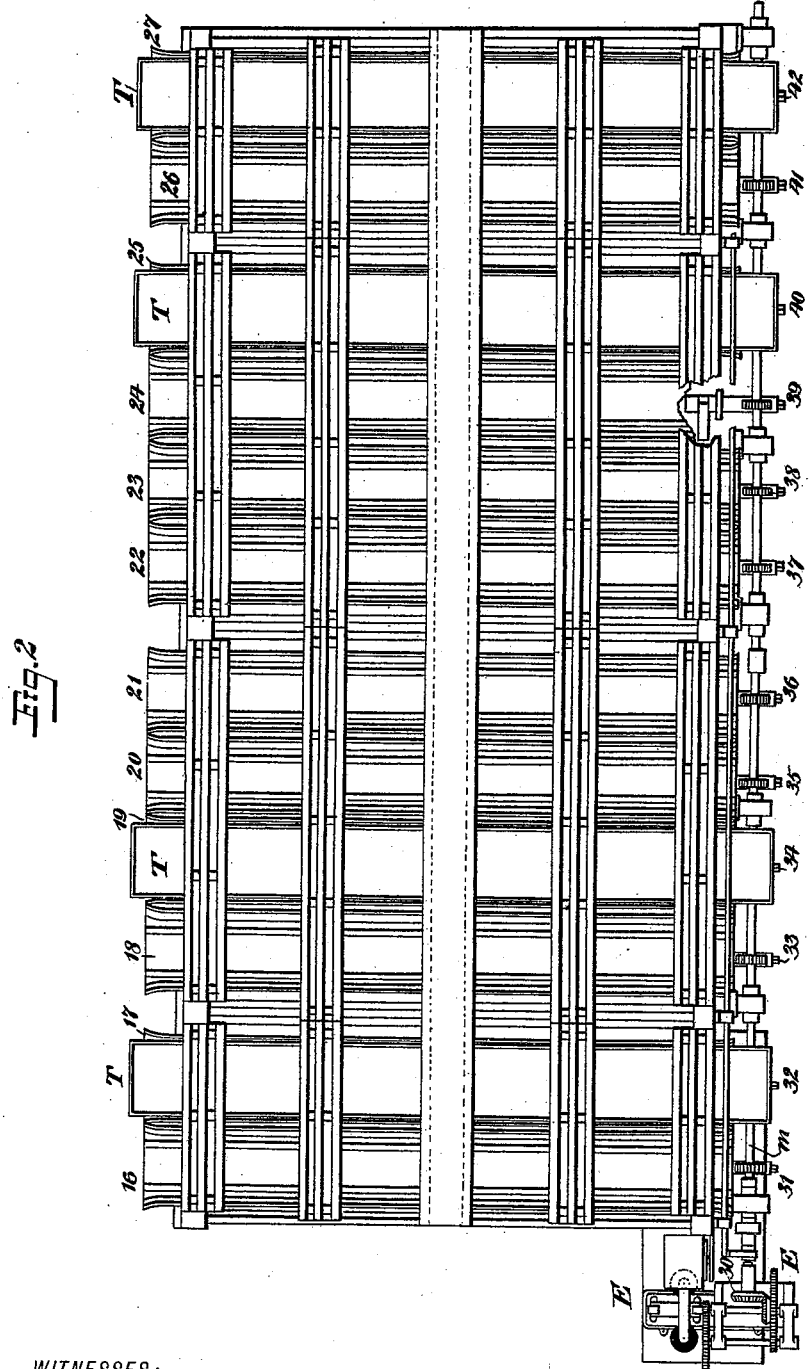

The accompanying drawings illustrate my invention:

Figure 1 is a complete plan view of the car, the transfer truck with its track, and the charging table; the floor plan of the car is shown, and the car is in a position such that the trays containing the batteries can be run out and onto the transfer truck, a floor plan view of which is also shown. By a movement of the transfer truck a little greater than the width of a trough or tray containing the batteries the two trays containing the fully charged cells are placed in line with the openings in the car from which the discharged cells were taken, and the freshly charged cells are slid into position in the car, the transfer truck is then moved along upon its rails until the troughs containing the discharged cells are in line with vacant tracks on the charging table, and the discharged cells are then slid into position on the charging table. Fig. 2 is a plan view of the charging table and shows the electric motor operating a shaft carrying a series of cogged wheels or pinions, one such wheel or pinion being assigned to each track or way on the table. Fig. 3 is a front vertical view of the charging table. Fig. 4 is a cross section taken on the line of the arrows shown in Fig. 3. This view shows the details of construction of the table and the arrangement of the cam, by means of which the rack on the bottom of the tray or trough is placed in mesh with the pinion on the motor driven shaft. Fig. 5 is a plan view of the transfer truck. Fig. 6 is a front vertical view showing electric motor and certain other details, and Fig. 7 is a vertical side view of the transfer truck.

Referring to Fig. 1, A is the floor plan view of the ordinary street railway car or tram car, having platforms P; there are doors $d$ in the dash board and there are similar doors in the end of the car body, not shown; the trays T T containing a series of cells of secondary battery are shown in position under the longitudinally arranged seats for passengers. Adjacent to the car A is a transfer truck B; there are tracks or ways 1, 2, 3, 4 arranged parallel with respect to each other and cross ways of the truck; extending longitudinally of each trough or tray T is a cogged strip or rack 200, shown in Figs. 5 and 7. On the transfer truck B there is a motor driven shaft S extending from one end of the truck to the other; the bevel pinion 5 on one end of shaft S meshes with the bevel pinion driven by the armature shaft of an electric motor, as shown in Figs. 5 and 6. It is desirable to so arrange the motive power on this truck that the cogged wheels or pinions on two alternate parallel tracks or ways on the truck shall rotate in a direction to slide the troughs or trays located thereon in one direction while the cogged wheels or pinions in alternate parallel rows shall rotate in the opposite direction, so as to provide means for sliding the troughs or trays from the truck to the car in one case and from the car to the truck in the other case, and this end is accomplished in the following manner: On one end of the shaft S there is a cogged wheel 6 meshing with the cogged wheel 7 on a parallel shaft upon the opposite end of which is a cogged wheel 10 and this shaft is of sufficient length to admit of placing the cogged wheel 10 in the center of the track or way 2; meshing with the wheel 7 is a wheel 8 on one end of a short shaft upon the opposite end of which is a wheel 9 arranged in position central with respect to the track or way 1; at the opposite end of the track and at the opposite end of the shaft S there is a cogged wheel 11 meshing with a wheel 12 on a short shaft, upon the opposite end of which is a cogged wheel 14 arranged centrally with respect to the track or way 4, and meshing with the wheel 12 is a wheel 13 on the end of the longer shaft, upon the opposite end of which shaft is a cogged wheel 15 in a position central with respect to the track or way 3; it will thus be seen that the wheels 6 and 8 and 11 and 13 rotate in one direction while the wheels 7 and 10 and 12 and 14 rotate in the opposite direction, and by this arrangement it will be clear from an inspection that the troughs or trays T engaging with the wheels 10 and 14 will be moved from the car to the truck, while the troughs or trays meshing with the wheels 9 and 15 will be moved from the transfer truck to the car. The transfer truck or car has an axle $x$ approximately equal to the length of a trough or tray, upon the opposite ends of which are flanged wheels W traveling upon the rails R; suspended above the rails R are trolley lines $l$ and there is a double trolley $t$ carried by the car as shown in Figs. 1, 6 and 7.

Still referring to Fig. 1, attention is directed to the charging table C. This table is composed of uprights and diagonal braces substantially as shown in cross section in Fig. 4; upon the top of the table there is a series of parallel tracks or ways each equipped with two angular rails, 50, as shown in Fig. 3; these angular rails curve outwardly at the entering end, and they are so arranged as to nicely fit the lower edges of the trough or tray which is to be slid along upon them; these tracks for the troughs or trays are numbered 16 to 27 inclusive—see Figs. 1 and 2. Across the end of the charging table there extends a long shaft $m$. The driven shaft of an electric motor is equipped with a beveled wheel which meshes with the beveled pinion 30 on one end of this shaft $m$, and at intervals on the shaft $m$ are the series of cogged pinions designated 31 to 42; these pinions are arranged centrally between the tracks for the troughs or trays. A series of strips of wood V is arranged above the table, and on these are arranged the electrical wires and connections. When the discharged cells are placed upon the transfer truck, the truck is moved along upon the rails until the troughs or trays are opposite vacant tracks on the charging table; the tracks or ways upon the transfer truck are normally at substantially the same height or on a level with the tracks or ways upon the charging table, and when the troughs or trays upon the truck are at the proper point the electric motor on the truck is operated to propel the trays containing the discharged cells into position on the charging table, and as soon as the end of the trough or tray has advanced sufficiently far to engage with the motor driven pinions upon the transfer table, this pinion operates to complete the movement and deposits the discharged troughs T' upon the charging table where the process of charge immediately begins. When the troughs or trays have reached their position of rest upon the charging table it is necessary or desirable to disengage the rack carried on the bottom of each trough with respect to the motor driven pinion which has carried it into position, while at the same time the pinion and rack are not carried so far out of position with respect to each other that they may not readily be placed in operative contact or action, for this purpose I have provided a cam movement, shown in Figs. 3 and 4, whereby the end of the trough or tray and the rack thereon is elevated a sufficient distance to throw the teeth on the rack out of mesh with respect to the motor driven pinion.

K is a cam on an arbor $k$ supported by a bracket $k'$, the arbor $k$ has a squared end to provide for its operation by means of a crank operated by hand in the usual manner; as soon as the trough is in position, or has reached its seat, the cam is turned so as to lift the end of the trough T a distance sufficient to throw the rack and pinion out of gear, and by reversing the movement the rack and pinion may be again put in gear so as to transfer the trough from the charging table to the truck.

In Fig. 6 $h$ $h$ are handles for operating clutch mechanism by which the movements of the shafts are started and stopped or reversed, and also for throwing the electric motor in and out of circuit. There are three of these handles; the center one of the three operates a circuit controlling switch which may be of any well known description; one of the outer handles operates to throw the gear wheels or a clutch in and out between the car axle and the motor and the other handle performs the same operation between the motor and the shafts carrying the toothed wheels which move the battery troughs. The specific devices are not illustrated or described because deemed within the art of any mechanic and are not deemed novel parts of my invention.

In Figs. 3 and 4 there is a switch, 100, operating the electric motor E and there are bars 98 and 99 extending the length of the charging table; to the bar 98 there are attached handles 102 and 104, and to the bar 99 there are attached handles 103 and 105; these bars are arranged in bearings designated 93—97 in which bearings said bars have a longitudinal movement. One bar 98, is connected with the switch 100 and the other bar, 99, is connected with the bar 91 pivoted at the point 92 which operates a clutch mechanism to throw the motor shaft in and out of gear; these bars and handles are so arranged that the motor and the clutch mechanism may be controlled by a man standing at any point along the front of the charging table.

The details of the electrical connections it is not deemed necessary to show, as they are such that any artisan of skill and ability in applying electricity to motive power purposes could readily make them.

The operation of the apparatus is as follows: The car A containing the trays of exhausted batteries T is run into the car house upon a track at right angles to the track upon which travels the transfer truck B. The trays T containing the discharged batteries are moved by hand, or in any suitable manner, a sufficient distance to permit the racks on the bottom thereof to engage with the wheels 10 and 14 on the transfer truck and the electric motor on the transfer truck is started into operation completing the movement of the discharged trays from the car to the transfer truck, the transfer truck is then moved along about the width of a tray and the electric motor driving the cogged wheels 9 and 15 operates to slide the trays T' containing the charged cells from the transfer truck to the car, the transfer truck B is then moved along by the propelling power of its electric motor, which takes current through the trolley $t$ from the trolley line $l$ which is connected to any suitable source of electricity until said transfer truck arrives at a position where the trays containing the discharged cells are in line with the guides 50 of the tracks or ways, say 22 and 24; the electric motor on the transfer truck is then shifted and operated to move the trays and the racks into engagement with the pinions 37 and 39; the motor is then started into operation and rotation of the shaft $m$ moves the discharged trays into position on the charging table, where the operation of charging may be immediately begun; as soon as the trays are in position on the charging table, the cams K corresponding thereto are operated and the racks on the trays are thrown out of mesh with the pinions on shaft $m$; newly charged cells are then moved onto the transfer truck, the transfer truck is then moved along on its track into position to make exchange with the next car which is presented for the exchange described.

What I claim, and desire to secure by Letters Patent, is—

1. The combination of an electrically propelled car; secondary batteries carried thereby and one or more trays or troughs for the batteries each having a cogged strip attached to the bottom thereof a transfer truck having a series of cogged wheels arranged to mesh with the racks on said trays, said cogs being arranged in parallel planes; a source of power to produce the rotation of said cogs, and intermediate cogs or wheels so arranged that alternate cogs engaging with the tray racks rotate in opposite directions; a track for the transfer truck, and a charging table to receive the trays or troughs of battery arranged at substantially the same level as the transfer truck whereby the batteries may be removed from the car to the transfer truck or from the transfer truck to the charging table, substantially as described.

2. The combination of an electrically propelled car; secondary batteries carried thereby; seats for passengers arranged parallel with respect to each other and longitudinally of the car; a trough or tray located under each seat and extending from one end of the car to the other in which the batteries are placed; a transfer truck having a breadth or gage substantially equal to the length of said troughs or trays, and means for drawing the trough or tray from the car to the truck and from the truck to the car consisting of cogged strips one for each trough or tray, and a series of cogged wheels located on the transfer truck arranged in parallel planes; a source of power for rotating said cogged wheels and connections between said source of power and said wheels whereby the two alternate cogged wheels are rotated in one direction and two other alternate cogged wheels rotated in the opposite direction, substantially as described.

3. The combination of an electrically propelled car; secondary batteries carried thereby; seats for passengers arranged parallel with respect to each other and longitudinally of the car; a trough or tray located under each seat and extending from one end of the car to the other in which the batteries are placed; a transfer truck having a breadth or gage substantially equal to the length of said troughs or trays; a series of parallel guides or ways arranged crosswise of said transfer truck, means for drawing the troughs or trays from the car to the truck and from the truck to the car consisting of a motor driven shaft extending from one end of the car to the other; two short shafts arranged adjacent and parallel thereto carrying cogged wheels meshing with the cogged wheels on the first named shaft and carrying cogged wheels or pinions located under two alternate tracks or ways and two parallel shafts carrying cogged wheels meshing with the last named cogged wheels respectively, said last named shafts carrying cogged wheels or pinions located under the two other alternate tracks or ways, substantially as described.

4. The combination of an electrically propelled car or vehicle; trays or troughs containing secondary batteries located thereon; a transfer truck; an electric motor having its armature shaft mechanically connected with the wheel or axle thereof; a series of cogged wheels also driven by said motor and meshing with cogged racks on said troughs or trays; a line of rails upon which the transfer truck travels, and a charging table having a series of parallel guides or ways to receive the troughs or trays, substantially as described.

5. The combination of an electrically propelled car or vehicle; troughs or trays containing secondary batteries located thereon cogged racks attached to the troughs or trays; a charging table having a series of parallel guides or ways to receive the troughs or trays; a series of cogged wheels one for each track or way in position to engage with the rack on a trough or tray, and means for disengaging any trough or tray from its cogged wheel, substantially as described.

6. The combination of an electrically propelled car or vehicle; troughs or trays containing secondary batteries located thereon cogged racks attached to the troughs or trays; a charging table having a series of parallel guides or ways to receive the troughs or trays; a series of cogged wheels one for each track or way in position to engage with the rack on a trough or tray, and means for disengaging any trough or tray from its cogged wheel, consisting of a series of independently moving cam wheels one for each track or way, arranged and operated substantially as described.

7. The combination of an electrically propelled car or vehicle; troughs or trays located thereon containing cells of secondary battery compactly arranged; a cogged rack firmly connected to each trough or tray; a transfer truck and a line of rails upon which said transfer truck travels; an electric motor on the transfer truck by which it is propelled; parallel guides or ways upon the transfer truck to receive secondary battery trays; a series of motor driven cogged wheels one for each track or way in position to engage with the cogged rack upon a trough or tray; a charging table; a series of parallel tracks or ways located thereon to receive the troughs or trays; a series of motor driven cogged wheels one for each track or way, each in position to engage with a rack upon its trough or tray, all arranged and operated substantially as described.

8. The combination of a charging table composed of a frame or structure having a series of parallel tracks or ways, and a cogged wheel for each pair of tracks; a series of troughs or trays, each containing a series of cells of secondary battery sliding or moving upon the said tracks or ways; a cogged rack attached to each such trough or tray in position to engage with a cogged wheel; an electrically propelled vehicle, and one or more troughs or trays located on said vehicle each containing a series of cells of secondary battery; a transfer car or truck having a series of tracks or ways located thereon; a cogged wheel for each such track or way, in position to engage with the cogged strip attached to a trough or tray; a track upon which the said transfer truck moves situated at right angles to the electrically propelled vehicle and to the ways or tracks upon the transfer table, and means substantially as described for rotating the wheels on the transfer truck in engagement with the rack upon the troughs or trays to transfer the troughs from the car to the transfer truck and from the transfer truck to the charging table, and means substantially as described for rotating the cogged wheels connected with the transfer table in engagement with the racks upon the troughs or trays whereby the said troughs may be transferred from the charging table to the transfer truck, substantially as described.

9. The combination of a charging table composed of a series of parallel tracks or ways diverging or flaring at their entering end; a cogged wheel for each pair of tracks; a series of troughs or trays each containing a series of cells of secondary battery arranged to slide or move upon said tracks or ways; a cogged rack attached to each such trough or tray; an electrically propelled vehicle upon which is located one or more troughs or trays each containing a series of cells of secondary battery; a transfer truck having a series of tracks or ways flaring or diverging at their entering end to receive said trays; a cogged wheel for each such track or way in position to engage with the cogged strip attached to the trays; a railway track upon which said transfer truck moves situated at right angles to the electrically propelled vehicle and to the ways or tracks upon the transfer table; means for rotating the wheels on the transfer truck in engagement with the rack upon the troughs or trays carried by the electrically propelled vehicle to move said trays from the vehicle to the transfer truck and from the transfer truck to the charging table; and means for rotating the cogged wheels upon the charging table to move the trays from the charging table to the transfer truck substantially as described.

10. The combination of a charging table having a series of tracks; a cogged wheel adjacent to each track; an electrically propelled vehicle having one or more tracks or ways to receive the trays of secondary battery, said vehicle being situated in the vicinity; a transfer truck carrying a series of parallel tracks or ways; a cogged wheel adjacent to each track, and a railway track extending from the vehicle to the charging table, upon which the transfer truck travels, said track being at substantially right angles with respect to the tracks or ways upon the electrically propelled vehicle and upon the charging table, so that said transfer truck when adjacent to the electrically propelled vehicle will present the tracks or ways upon its surface in substantially the same plane with the tracks or ways upon the said vehicle, and when adjacent to the charging table will present the tracks or ways upon its surface in substantially the same plane with the tracks or ways upon the surface of the charging table; a series of troughs or trays each having a cogged rack attached thereto in position to engage with the cogged wheels upon the charging table and upon the transfer truck, and means for rotating said cogged wheels substantially as described to transfer the said trays from the charging table to the transfer truck and from the transfer truck to the car and vice versa, substantially as described.

11. In a charging table a series of parallel tracks or ways and a series of troughs or trays each containing a number of cells of secondary battery; a cogged rack attached to each trough or tray; cogged wheels located on the charging table in position to engage with said racks; means substantially as described for rotating said wheels to move the troughs or trays and a suitable device for disengaging the rack on any trough from its cogged wheel, substantially as described.

12. In a charging table a series of parallel tracks or ways and a series of troughs or trays each containing a number of cells of secondary battery; a cogged rack attached to each trough or tray; cogged wheels located on the charging table in position to engage with said racks; means substantially as described for rotating said wheels in engagement with the racks to move the troughs or trays, and a series of cam wheels, one for each track, each operating to disengage its rack and cogged wheel substantially as described.

MATHIAS PFATISCHER.

Witnesses:
L. A. WHITLEY,
AL. P. BURCHELL.